(12) United States Patent
Zavaliagkos et al.

(10) Patent No.: US 7,274,775 B1
(45) Date of Patent: Sep. 25, 2007

(54) TRANSCRIPTION PLAYBACK SPEED SETTING

(75) Inventors: George Zavaliagkos, Acton, MA (US); Ben Chigier, Wellesley, MA (US); Roger Scott Zimmerman, Wellesley, MA (US)

(73) Assignee: eScription, Inc., Needham, MA (US)

( * ) Notice: Subject to any disclaimer, the term of this patent is extended or adjusted under 35 U.S.C. 154(b) by 438 days.

(21) Appl. No.: 10/650,961

(22) Filed: Aug. 27, 2003

(51) Int. Cl.
*H04M 1/64* (2006.01)

(52) U.S. Cl. ............ 379/75; 369/25.01; 704/270

(58) Field of Classification Search ........... 360/73.07; 379/75; 369/25.01; 704/270
See application file for complete search history.

(56) References Cited

U.S. PATENT DOCUMENTS

| | | | |
|---|---|---|---|
| 5,146,439 A * | 9/1992 | Jachmann et al. | 369/25.01 |
| 5,519,808 A | 5/1996 | Benton, Jr. et al. | 704/270 |
| 5,812,882 A | 9/1998 | Raji et al. | 710/72 |
| 6,374,225 B1 * | 4/2002 | Hejna, Jr. | 704/270 |
| 6,865,258 B1 * | 3/2005 | Polcyn | 379/88.01 |
| 6,996,445 B1 * | 2/2006 | Kamijo | 700/94 |
| 2003/0046080 A1 * | 3/2003 | Hejna, Jr. | 704/270 |

* cited by examiner

*Primary Examiner*—Fan Tsang
*Assistant Examiner*—Hemant Patel
(74) *Attorney, Agent, or Firm*—Mintz, Levin, Cohn, Ferris, Glovsky and Popeo, P.C.

(57) ABSTRACT

A computer program product resides on a computer-readable medium, and includes computer-readable, computer-executable instructions for causing a computer to analyze a first playback speed history for at least one audio recording recorded by a first speaker and played by a first listener, the playback speed history being indicative of at least one playback speed associated with the at least one audio recording, and to determine from the first playback speed history a speed setting for playback of another audio recording recorded by a second speaker to be played by a second listener.

27 Claims, 6 Drawing Sheets

TRANSCRIPTION PLAYBACK SPEED SETTING

FIELD OF THE INVENTION

The invention relates to setting and/or adjusting the speed at which transcription audio is played during review of a transcription.

BACKGROUND OF THE INVENTION

Healthcare costs in the United States account for a significant share of the GNP. The affordability of healthcare is of great concern to many Americans. Technological innovations offer an important leverage to reduce healthcare costs.

Many Healthcare institutions require doctors to keep accurate and detailed records concerning diagnosis and treatment of patients. Motivation for keeping such records include government regulations (such as Medicare and Medicaid regulations), desire for the best outcome for the patient, and mitigation of liability. The records include patient notes that reflect information that a doctor or other person adds to a patient record after a given diagnosis, patient interaction, lab test or the like.

Record keeping can be a time-consuming task, and the physician's time is valuable. The time required for a physician to hand-write or type patient notes can represent a significant expense. Verbal dictation of patient notes offers significant time savings to physicians, and is becoming increasingly prevalent in modern healthcare organizations.

Over time, a significant industry has evolved around the transcription of medical dictation. Several companies produce special-purpose voice mailbox systems for storing medical dictation. These centralized systems hold voice mailboxes for a large number of physicians, each of whom can access a voice mailbox by dialing a phone number and putting in his or her identification code. These dictation voice mailbox systems are typically purchased or shared by healthcare institutions. Prices can be over $100,000 per voice mailbox system. Even at these prices, these centralized systems save healthcare institutions vast sums of money over the cost of maintaining records in a more distributed fashion.

Using today's voice mailbox medical dictation systems, when a doctor completes an interaction with a patient, the doctor calls a dictation voice mailbox, and dictates the records of the interaction with the patient. The voice mailbox is later accessed by a medical transcriptionist who listens to the audio and transcribes the audio into a text record. The playback of the audio data from the voice mailbox may be controlled by the transcriptionist through a set of foot pedals that mimic the action of the "forward", "play", and "rewind" buttons on a tape player. Should a transcriptionist hear an unfamiliar word, the standard practice is to stop the audio playback and look up the word in a printed dictionary.

Some medical transcriptionists may specialize in one area of medicine, or may deal primarily with a specific group of doctors. The level of familiarity with the doctors' voices and with the subject matter can increase the transcriptionist accuracy and efficiency over time.

The medical transcriptionist's time is less costly for the hospital than the doctor's time, and the medical transcriptionist is typically much more familiar with the computerized record-keeping systems than the doctor is, so this system offers a significant overall cost saving to the hospital.

Expedient processing of doctor's dictation is often desirable so that records can be passed between one part of a healthcare institution and another (such as from Radiology to Surgery), or so that records can be passed to another institution if the next step in a patient's care requires that the patient be moved to another facility. In addition to being timely, accuracy of medical transcriptions is of paramount importance. A mistake in a medical transcription could mean the difference between life and death. In transcribing doctor's orders for such procedures as chemotherapy and radiation therapy for cancer patients, an elaborate system of double-checking by separate people is standard to mitigate risk.

It is an object of the present invention to significantly reduce the cost of medical transcription. It is a further object of the present invention to increase the accuracy of medical transcription. It is a further object of the present invention to improve the expediency and turn-around time of medical transcription. It is a further object of the present invention to reduce stress on medical transcriptionists.

SUMMARY OF THE INVENTION

In general, in an aspect, the invention provides a computer program product residing on a computer-readable medium and including computer-readable, computer-executable instructions for causing a computer to analyze a first playback speed history for at least one audio recording recorded by a first speaker and played by a first listener, the playback speed history being indicative of at least one playback speed associated with the at least one audio recording, and to determine from the first playback speed history a speed setting for playback of another audio recording recorded by a second speaker to be played by a second listener.

Implementations of the invention may include one or more of the following features. The first listener is the second listener, the first speaker is the second speaker and the instructions are configured to cause the computer to determine the speed setting using a current playback speed setting associated with the second speaker and the listener. The instructions are configured to cause the computer to determine the speed setting by determining an adjustment to be made to the current playback speed setting. The instructions are configured to cause the computer to determine the speed setting by modifying the adjustment based at least on a second playback history for at least one audio recording recorded by a third speaker and played by the listener. The instructions are configured to cause the computer to modify the adjustment based on an average playback speed of multiple speakers listened to by the listener. The instructions are configured to cause the computer to analyze the first playback speed history to determine an indication of a willingness/reluctance of the listener to listen to recordings of the speaker faster than the current playback speed. The instructions are configured to cause the computer to analyze the first playback speed history to categorize the indication into one of a plurality of ranges of willingness/reluctance. The instructions are configured to cause the computer to determine the speed setting by determining an adjustment to be made to the current playback speed setting based on with which of the ranges the indication is associated. The instructions are configured to cause the computer to determine the indication of willingness/reluctance by ignoring a speed setting in the first playback speed history. The instructions are configured to cause the computer to ignore the speed setting in the first playback speed history if the speed setting is at least one of above an absolute threshold, and above a threshold that is dependent upon the current playback speed and is isolated. The instructions are configured to cause the computer to determine the speed setting by averaging speeds indicated by the first playback speed history.

Also, implementations of the invention may include one or more of the following features. The speed setting is an initial speed setting for playback. The computer program product further includes instructions for causing the computer to store an indication of the determined speed setting as part of a second playback speed history such that the computer program product can learn from historical speed settings and adapt future speed settings based on the historical speed settings. The computer program product further includes instructions for causing the computer to determine the speed setting based on at least one factor other than the first playback speed history. The at least one other factor comprises at least one of an amount of time, a number of transcriptions reviewed by a particular transcriptionist, and a number of transcriptions of a particular speaker reviewed by the particular transcriptionist.

In general, in another aspect, the invention provides a device for use in a transcription editing system for editing transcriptions of dictations from speakers by transcriptionists, the device including an interface configured to receive historical indicia of playback speeds used by the transcriptionists, and playback speed means, coupled to the interface, for determining and setting a future playback speed for a selected transcriptionist based on a historical playback speed associated with at least one of the transcriptionists, and for sending a future-speed indication of the future playback speed to the interface, where the historical playback speed is indicative of at least one playback speed associated with a playback speed used by at least one of the transcriptionists, the interface is further configured to convey the future-speed indication from the playback speed means.

Implementations of the invention may include one or more of the following features. The device of claim 16 wherein the playback speed means determines the future playback speed using a current playback speed setting associated with the transcriptionist and a speaker. The playback speed means determines the future playback speed by determining an adjustment to be made to the current playback speed setting. The playback speed means modifies the adjustment based on an average playback speed associated with the transcriptionist. The playback speed means analyzes the historical playback speed indicia to determine an indication of a willingness/reluctance of the transcriptionist to listen to recordings of a speaker faster than the current playback speed. The playback speed means determines the indication of willingness/reluctance by ignoring a speed setting in the historical playback speed indicia.

Also, implementations of the invention may include one or more of the following features. The interface is configured to communicate over a network with a database that stores the historical playback indicia to store the future playback speed. The future playback speed is an initial playback speed. The playback speed means is configured to determine the future playback speed based on at least one factor other than the historical playback speed. The at least one other factor comprises at least one of an amount of time, a number of transcriptions reviewed by a particular transcriptionist, and a number of transcriptions of a particular speaker reviewed by the particular transcriptionist.

In general, in another aspect, the invention provides a method of determining a transcription audio playback speed, the method including analyzing a first playback speed history for at least one audio recording recorded by a first speaker and played by a first listener, the playback speed history being indicative of at least one playback speed associated with the at least one audio recording, and determining from the first playback speed history a speed setting for playback of another audio recording recorded by a second speaker to be played by a second listener.

Implementations of the invention may include one or more of the following features. The first listener is the second listener, the first speaker is the second speaker and determining the speed setting uses a current playback speed setting associated with the second speaker and the listener. Determining the speed setting includes determining an adjustment to be made to the current playback speed setting. Determining the speed setting includes modifying the adjustment based at least on a second playback history for at least one audio recording recorded by a third speaker and played by the listener. The adjustment is modified based on an average playback speed associated with the listener.

Also, implementations of the invention may include one or more of the following features. Analyzing the first playback speed history yields an indication of a willingness/reluctance of the listener to listen to recordings of the speaker faster than the current playback speed. Analyzing the first playback speed history includes categorizing the indication into one of a plurality of ranges of willingness/reluctance. Determining the speed setting includes determining an adjustment to be made to the current playback speed setting based on with which of the ranges the indication is associated. Determining the indication of willingness/reluctance includes ignoring a speed setting in the first playback speed history. The speed setting is ignored in the first playback speed history if the speed setting is at least one of above an absolute threshold, and above a threshold that is dependent upon the current playback speed and is isolated.

Also, implementations of the invention may include one or more of the following features. Determining the speed setting includes averaging speeds indicated by the first playback speed history. The speed setting is an initial speed setting for playback. The method further includes storing an indication of the determined speed setting as part of a second playback speed history to learn from historical speed settings and adapt future speed settings based on the historical speed settings. Determining the speed setting is based on at least one factor other than the first playback speed history. The at least one other factor comprises at least one of an amount of time, a number of transcriptions reviewed by a particular transcriptionist, and a number of transcriptions of a particular speaker reviewed by the particular transcriptionist.

Various aspects of the invention may provide one or more of the following advantages. Transcriptionists can be encouraged to review documents quicker. Transcriptions can be played to trancriptionists at customized rates corresponding to particular speakers and particular transcriptionists. Transcription review times, and corresponding cost, can be reduced. Initial playback speeds for a new transcriptionist-speaker pair can be set based on speeds associated with the transcriptionist for other speakers. Playback speeds can be adjusted for transcriptionist-speaker pairs, e.g., as the transcriptionist reviews more transcriptions from particular speakers. Transcriptionists' experiences and transcription editing quality may be improved, e.g., by playing audio at a speeds preferred by the various transcriptionists. Systems can learn and adapt to transcriptionists and transcriptionist-speaker pairs regarding playback speed of a transcribed dictation. A database of transcriptions can store a very large amount of transcription information.

These and other advantages of the invention, along with the invention itself, will be more fully understood after a review of the following figures, detailed description, and claims.

DETAILED DESCRIPTION OF PREFERRED EMBODIMENTS

Embodiments of the invention can automatically adjust the playback speed in a system for editing text documents each of which is associated with a digital audio signal of speech to be transcribed. Dictation from any of multiple speakers can be accessed by multiple transcriptionists, with any transcriptionist potentially editing dictations from any of the speakers. A playback speed setting is provided for every speaker-transcriptionist pair, and possibly based on further information, e.g., the worktype of a dictation. The transcriptionist's speed-setting preferences for each speaker are tracked and the playback speed is gradually adjusted in accordance with the transcriptionist's settings. Additionally, the transcriptionist is encouraged over time to speed up the playback, in order to reduce the amount of time used to edit documents. Resistance by the transcriptionist to the proposed speed increases may be accounted for, and transient adjustments to playback speed employed by the transcriptionist may be ignored since these are not likely to indicate a general preference. The transcriptionist's speed adjustments may be ascertained from various sources such as through foot-pedal control, keyboard hot-key control, and on-screen applet control. The playback speed can be adjusted without varying the perceived pitch of the audio signal, so that the speech continues to sound natural, independent of speed setting. Other embodiments are within the scope of the invention.

Figure 1:
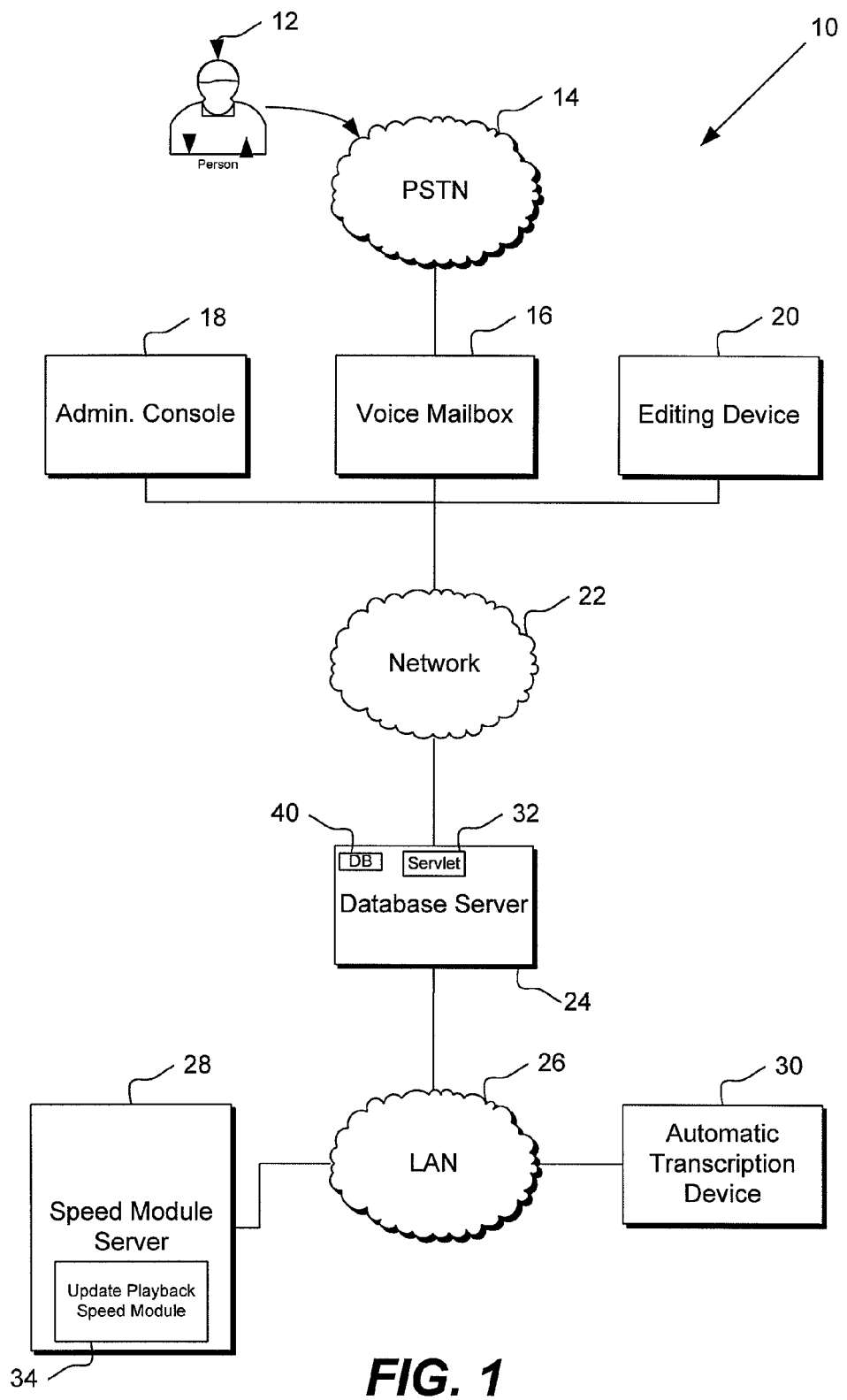
FIG. 1 is a simplified diagram of a system for transcribing dictations and editing corresponding transcriptions.

Referring to FIG. 1, a system 10 for transcribing audio and editing transcribed audio includes a speaker/person 12, a communications network, 14, a voice mailbox system 16, and administrative console 18, an editing device 20, a communications network 22, a database server 24, a communications network 26, a speed module server 28, and an automatic transcription device 30. Here, the network 14 is preferably a public switched telephone network (PSTN) although other networks, including packet-switched networks could be used, e.g., if the speaker 12 uses an Internet phone for dictation. The network 22 is preferably a packet-switched network such as the global packet-switched network known as the Internet. The network 26 is preferably a packet-switched, local area network (LAN). Other types of networks may be used, however, for the networks 14, 22, 26, or any or all of the networks 14, 22, 26 may be eliminated, e.g., if items shown in FIG. 1 are combined or eliminated.

Preferably, the voice mailbox system 16, the administrative console 18, and the editing device 20 are situated "off site" from the database server 24 and the automatic transcription device 30. These systems/devices 16, 18, 20, however, could be located "on site," and communications between them took place, e.g., over a local area network. Similarly, it is possible to locate the automatic transcription device 30 off-site, and have the device 30 communicate with the database server 24 over the 22.

The network 14 is configured to convey dictation from the speaker 12 to the voice mailbox system 16. Preferably, the speaker 12 dictates into an audio transducer such as a telephone, and the transduced audio is transmitted over the telephone network 14 into the voice mailbox system 16, such as the Intelliscript™ product made by eScription™ of Needham, Mass. The speaker 12 may, however, use means other than a standard telephone for creating the digital audio file for each dictation. For example, the speaker 12 may dictate into a handheld PDA device, that includes its own digitization mechanism for storing the audio file. Or, the speaker 12 may use a standard "dictation station," such as those provided by many vendors. Still other devices may be used by the speaker 12 for dictating, and possibly digitizing the dictation, and sending it to the voice mailbox system 16.

The voice mailbox system 16 is configured to digitize audio from the speaker 12 to produce a digital audio file of the dictation. For example, the system 16 may use the Intelliscript™ product made by eScription.

The voice mailbox system 16 is further configured to prompt the speaker 12 to enter an identification code and a worktype code. The speaker 12 can enter the codes, e.g., by pressing buttons on a telephone to send DTMF tones, or by speaking the codes into the telephone. The system 16 may provide speech recognition to convert the spoken codes into a digital identification code and a digital worktype code. The mailbox system 16 is further configured to store the identifying code and the worktype code in association with the dictation. The system 16 preferably prompts the speaker 12 to provide the worktype code at least for each dictation related to the medical field. The worktype code designates a category of work to which the dictation pertains, e.g., for medical applications this could include Office Note, Consultation, Operative Note, Discharge Summary, Radiology report, etc. The worktype code may be used to refine speed settings, such that settings may be specific not only to speaker-transcriptionist pairings, but further to worktype of dictations provided by the speaker, and/or to other parameters or indicia. The following discussion, however, focuses on using only speaker-transcriptionist pairings.

The voice mailbox system 16 is further configured to transmit the digital audio file and speaker identification code over the network 22 to the database server 24 for storage. This transmission is accomplished by the system 16 product using standard network transmission protocols communicating with the database server 24.

The database server 24 is configured to store the incoming data from the voice mailbox system 16, as well as from other sources. The database server 24 may include the Speech-Base™ database product from eScription. Software of the database server is configured to produce a database record for the dictation, including a file pointer to the digital audio data, and a field containing the identification code for the speaker 12. If the audio and identifying data are stored on a PDA, the PDA may be connected to a computer running the HandiScript™ software product made by eScription that will perform the data transfer and communication with the database server 24 to enable a database record to be produced for the dictation.

Preferably, all communication with the database server 24 is intermediated by a "servlet" application 32 that includes an in-memory cached representation of recent database entries. The servlet 32 is configured to service requests from the voice mailbox system 16, the automatic transcription device, the editing device 20, and the administrative console 18, reading from the database when the servlet's cache does not contain the required information. The servlet 32 includes a separate software module that helps ensure that the servlet's cache is synchronized with the contents of the database. This helps allow the database to be off-loaded of much of the real-time data-communication and to grow to be much larger than otherwise possible. For simplicity, however, the below discussion does not refer to the servlet, but all database access activities may be realized using the servlet application 32 as an intermediary.

The automatic transcription device 30 may access the database in the database server 24 over the data network 26 for transcribing the stored dictation. The automatic transcription device 30 uses an automatic speech recognition (ASR) device (e.g., software) to produce a draft transcription for the dictation. An example of ASR technology is the AutoScript™ product made by eScription, that also uses the speaker identifying information to access speaker-dependent ASR models with which to perform the transcription. The device 30 transmits the draft transcription over the data network 26 to the database server 24 for storage in the database and to be accessed, along with the digital audio file, by the editing device 20.

The editing device 20 is configured to be used by a transcriptionist to access and edit the draft transcription stored in the database of the database server 24. The editing device 20 includes a computer (e.g., display, keyboard, mouse, monitor, memory, and a processor, etc.), an attached foot-pedal, and appropriate software such as the EditScript™ software product made by eScription. The transcriptionist can request dictation job by, e.g., clicking on an on-screen icon. The request is serviced by the database server 24, that finds the dictation for the transcriptionist, and transmits the corresponding audio file, the draft transcription text file, and a current starting playback speed for the dictation as stored in the database and determined according to the discussion below.

The transcriptionist edits the draft using the editing device 20 and sends the edited transcript back to the database server 24. For example, to end the editing the transcriptionist can click on an on-screen icon button to instruct the editing device 20 to send the final edited document to the database server 24 via the network 22, along with a unique identifier for the transcriptionist.

The editing device 20 also sends to the database server 24 one or more indicia of one or more speed settings (e.g., a final speed setting or periodic speed settings) chosen/used by the transcriptionist during the editing session. One or more reported speed settings may be calculated, e.g., from a set of speed settings, and many possibilities exist for that calculation used, some or which are described in detail below.

With the data sent from the editing device 20, the database in the server 24 contains, for each dictation: a speaker identifier, a transcriptionist identifier, a file pointer to the digital audio signal, a file pointer to the edited text document, and one or more speed settings selected by the transcriptionist and/or that has/have been calculated.

The edited text document can be transmitted directly to a customer's medical record system or accessed over the data network 22 from the database by the administrative console 18. The console 18 may include an administrative console software product such as Emon™ made by eScription.

The speed module server 28 includes an update playback speed module 34 and can use the information stored in the database to determine beginning speed settings. The speed module 34 is configured to calculate the initial playback speed setting for future editing sessions invoked by a transcriptionist for and a speaker's dictations. The module 34 calculates initial speed settings by collating and manipulating the aforementioned database information. The initial speed is preferably a speed at which the transcriptionist will be comfortable and be able to accurately, yet quickly edit a transcription. This speed preferably balances the transcriptionist's need for comfort, the need for accurate editing, and the need for quick, cost-efficient editing. The initial speed may depend on any of numerous factors in any of theoretically infinite combinations, but preferably depends on at least the transcriptionist and the speaker. In further preferred embodiments, the initial speed also depends on the type of dictation. Further discussion of how the initial speed setting is determined is provided below in conjunction with the description of FIGS. 3-4.

Figure 2:
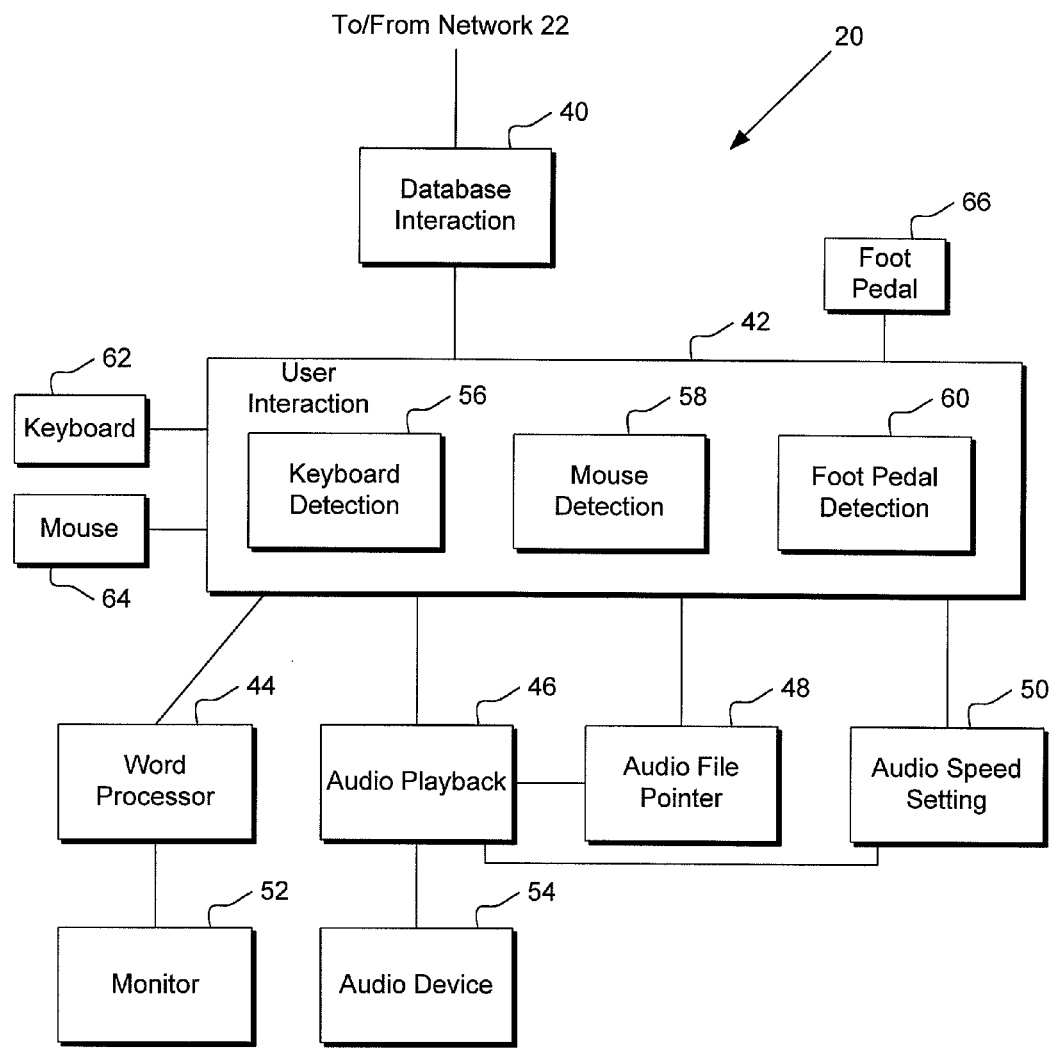
FIG. 2 is a simplified block diagram of an editing device of the system shown in FIG. 1.

Referring to FIG. 2, components of the editing device 20, e.g., a computer, include a database interaction module 40, a user interface 42, a word processor module 44, an audio playback module 46, an audio file pointer 48, an audio speed-setting module 50, a monitor 52, and an audio device 54. The monitor 52 and audio device 54, e.g., speakers, are physical components while the other components shown in FIG. 2 are functional components that may be implemented with software, hardware, etc., or combinations thereof. The audio playback device 46, such as a SoundBlaster® card, is attached to the audio output transducer 54 such as speakers or headphones. The database interaction, audio playback, and editing of the draft transcription is accomplished by means of the appropriate software such as the EditScript™ software product made by eScription. The editing software is loaded on the editing device computer 20 and configured appropriately for interaction with other components of the editing device 20. The editing software can use a standard word processing software library, such as that provided with Microsoft Word®, in order to load, edit and save documents corresponding to each dictation.

The editing software includes the database interaction module 40, the user interface module 42, the word processing module 44, the audio playback module 46, the audio file pointer adjustment module 48, and the audio playback speed-setting module 50. The user interface module 42 controls the activity of the other modules and includes keyboard detection 56, mouse detection 58, and foot pedal detection 60 sub-modules for processing input from a keyboard 62, a mouse 64, and a foot-pedal 66. The foot pedal 66 is a standard transcription foot pedal and is connected to the editing device computer through the computer's serial port. The foot pedal 66 preferably includes a "fast forward" portion and a "rewind" portion.

The transcriptionist can request a job from the database by selecting on-screen icon with the mouse 64. The user interface module 42 interprets this mouse click and invokes the database interaction module 40 to request the next job from the database. The database server 24 (FIG. 1) responds by transmitting the audio data file, the draft transcription file, and the initial speed setting to the database interaction module 42. With this information, the editing software can initialize a word-processing session by loading the draft text into the word processing module 44.

While the transcriptionist is editing the document, the user interface module 42 can service hardware interrupts from all three of its sub-modules 56, 58, 60. Most standard key presses and on-document mouse-clicks are sent to the word processing module 44 to perform the document editing functions indicated and to update the monitor display. Some user interaction, however, may be directed to the audio-playback oriented modules 46, 48, 50, e.g., speed control, audio position control, and/or volume control. The transcriptionist may indicate that editing is complete by clicking another icon. In response to such an indication, the final text file and a speed setting, e.g., the final speed setting used by the transcriptionist, from the speed-setting module 50 are sent through the database interaction module 42 to the database server 24.

Initially, the database has no information concerning the playback speed a given transcriptionist prefers for a given speaker. As such, if there is no, or insufficient, speed preference information for a transcriptionist (for any speaker), then the editing device 20 is configured to play draft documents for that speaker initially at "normal" speed, that is denoted by a speed setting of 100 (i.e., 100% of normal). If there is sufficient data for a transcriptionist but for other speakers (e.g., sufficient if the transcriptionist has edited more than a threshold number of draft documents), then the initial speed setting for the transcriptionist for a new speaker (to that transcriptionist) can be the average reported speed setting for that transcriptionist. When the transcriptionist receives a document from the given speaker at the editing device 20, the playback proceeds at the initial speed whenever the transcriptionist selects to play a portion of the audio. The transcriptionist can make this selection using any of several means such as the foot pedal 66, an on-screen mouse-selected button or a predefined hot key on the keyboard 62. These selections are serviced by the audio playback module 46 that copies the relevant portions of the audio file to the audio output device 54 so that they me be heard after transduction by the speakers or headphones.

The transcriptionist can use the foot pedal 66 to indicate to that the audio should be "rewound," or "fast-forwarded" to a different time point in the dictation. These foot-pedal presses are serviced as hardware interrupts by the user interaction module 42. Movement to a different part of the audio is implemented by the audio file pointer module 48 by incrementing or decrementing a pointer into the digital audio file. Hot keys and mouse clicks may also be used to adjust the audio file pointer.

Additionally, the transcriptionist can request the playback to be sped up or slowed down by pressing certain hot-keys on the computer keyboard 62 (or by other means, e.g., mouse clicks or foot pedal presses). For example, the transcriptionist can make such selections by pressing arrow keys on the keyboard 62. Additionally, the editing software may be configured to interpret multiple taps on the "fast forward" portion of the foot pedal 66 to indicate to speed up, and multiple presses on the "rewind" portion of the foot pedal 66 to request a slowing down of the audio. Or, the transcriptionist can indicate a desire to change the playback speed by clicking on an on-screen applet, such as one that simulates a tape-recorder control. The editing software is configured to increment or decrement the playback speed by a percentage of the current playback speed in response to speed-change requests by the transcriptionist. Additionally, the software sets a maximum and minimum playback speed above/below which the playback speed will not be further adjusted.

Preferably, when the transcriptionist indicates a change in playback speed, appropriate digital signal processing is used to modify the audio waveform so that it is played back at the desired speed, without altering the perceived pitch of the speaker's voice. Several standard methods are available for this, most of which involve removing digital audio samples from the waveform prior to routing them to the audio playback device. These techniques are implemented by the audio playback module 46.

Referring also to FIG. 1, a preferred audio playback speed is preferably determined for each dictation edited by a transcriptionist. This preferred speed can be determined by the editing device 20, or the editing device 20 may provide data (e.g., periodic indicia of current speed) from which the database server 24 or the speed module server 28 determines the preferred speed. Alternatively, the preferred speed could be determined by other portions of the system 10. The preferred speed is preferably determined for each dictation and stored in association with the corresponding edited text in the database. In this manner, the database is populated with the preferred playback speed for each dictation, with auxiliary information of which transcriptionist edited the dictation, and which speaker recorded the dictation in the voice mailbox 16.

The preferred speed can be any of numerous speeds, determined in any of numerous manners. For example, the preferred speed can be the audio playback speed setting at the end of a dictation. In this case, the editing device 20 may only measure the playback speed setting once before uploading this setting to the database server 24 for each dictation. Alternatively, the editing device 20 may keep track of the playback speed at periodic intervals during the editing of the dictation, and may compute an average or median playback speed for the entire document, sending this value to the database server 24, e.g., at the completion of editing, as the preferred speed.

Still further techniques can be used to determine the preferred speed, e.g., due to typical practices of transcriptionists. It is typical for transcriptionists to speed up the playback of the audio, as they have a goal of completing as much work in as little time as possible. This tendency is amplified where the automatically produced draft—assuming it is largely correct—acts as a further incentive to speed things up. Generally, transcriptionists will only slow the audio down for passages that are very difficult to understand. Once they have satisfactorily edited such passages, they will tend to speed the audio up again to its previous speed. Sometimes, however, the transcriptionist will again slow down the playback speed at the end of the dictation. The preferred speed can be determined by ignoring such behavior by the transcriptionist. For example, the preferred speed can be determined by taking the average or the mean speed over the dictation, except for a portion at the beginning, and/or a portion at the end of the dictation.

Figure 3:
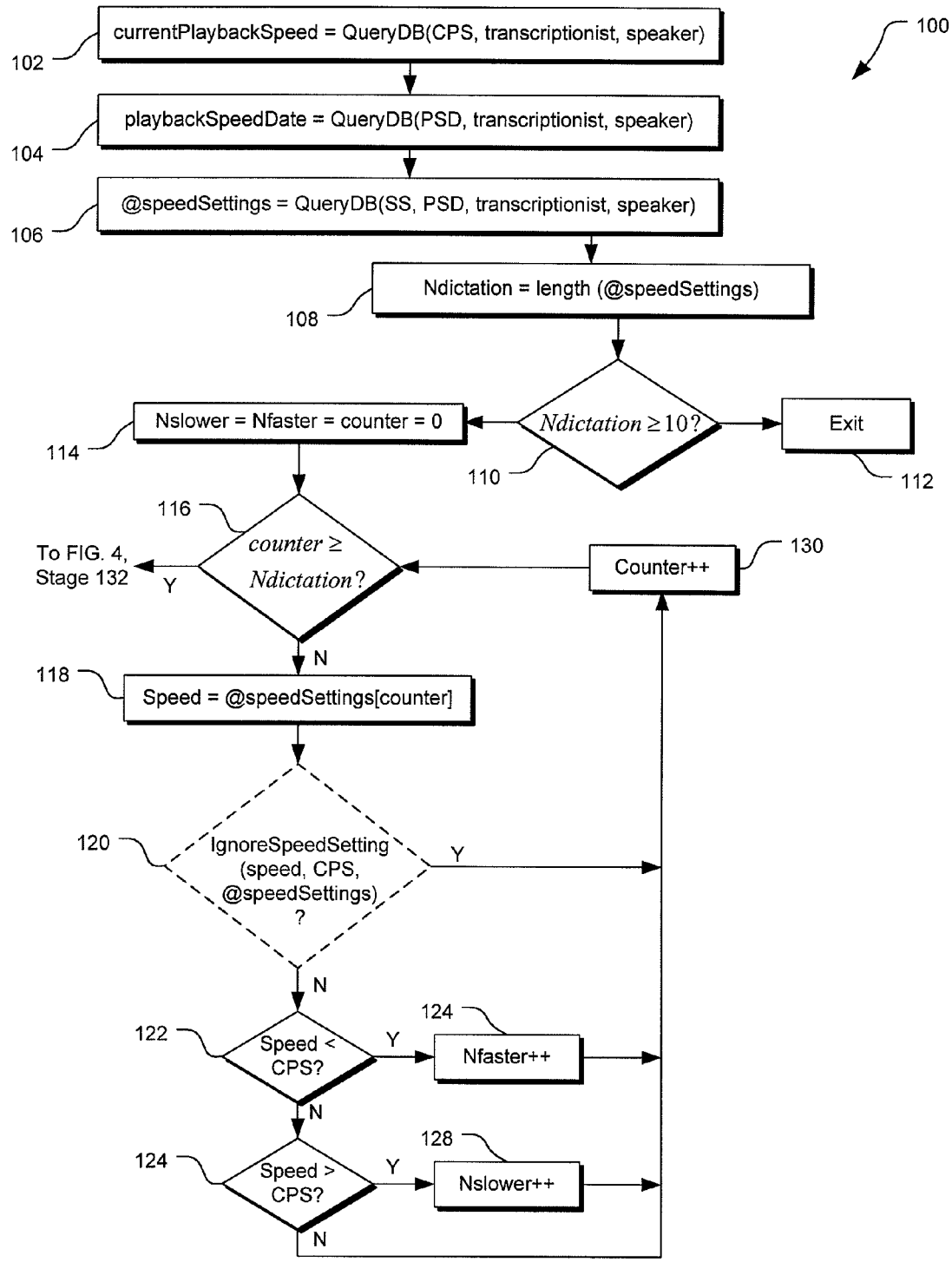
FIGS. 3-4 show a block flow diagram of a process of regulating playback of transcribed dictations using the system shown in FIG. 1.
Figure 4:
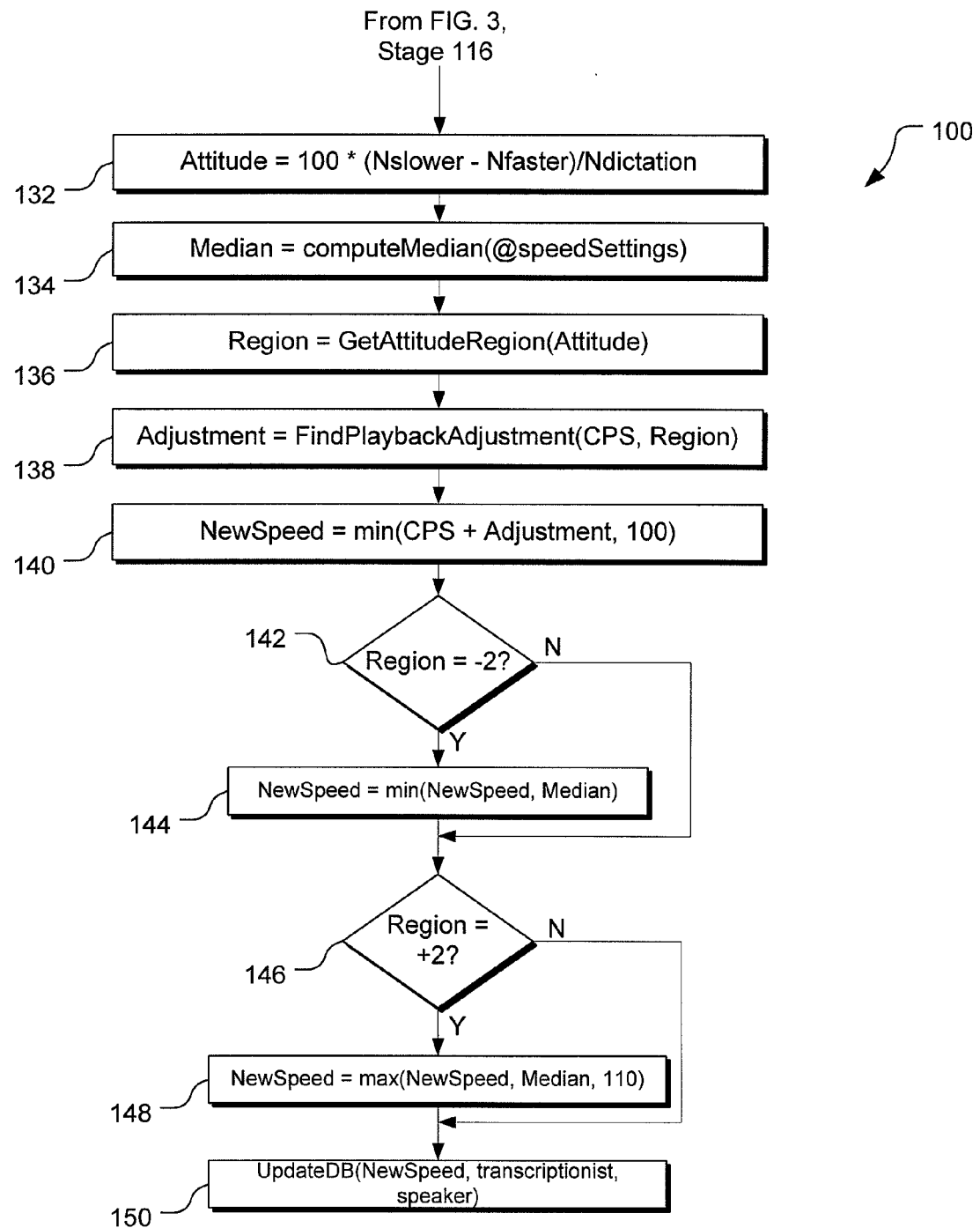

In operation, referring to FIGS. 3-4, with further reference to FIGS. 1-2, a process 100 for regulating the playback speed of a transcribed dictation using the system 10, and in particular the update playback speed module 34, includes the stages shown. The process 100, however, is exemplary only and not limiting. The process 100 can be altered, e.g., by having stages added, removed, or rearranged. The module 34 seeks to set a playback speed for a transcriptionist-speaker pair. The module may associate the transcriptionist with any number of other or further criteria, e.g., work type of a dictation, time of day of recording, time of day of editing, etc. The module 34 may be invoked periodically (for example, each night when the overall system activity is low) for all transcriptionist-speaker pairs in the database 40. For example, a double-nested loop may be used to cycle through and select each combination, with transcriptionist being the variable in the outer loop and the speaker being the variable in the inner loop as shown in the following pseudo code:

```
for transcriptionist in @transcriptionistList; do
    for speaker in @speakerList; do
        UpdatePlaybackSpeed(transcriptionist, speaker);
    done
done
```

At stage 102, the module 34 queries the database 40 for the current playback speed (CPS) for a selected transcriptionist-speaker pair. This speed setting is expressed as the percentage of the normal time it takes to play a given section of audio. Thus, a setting of 100 indicates "normal" speed, while 80 is speeded up by 20% relative to normal and 120 is slowed down by 20% relative to normal. A default value of 100 is set for each transcriptionist-speaker pair so that upon the first invocation of the module 34 the speed value of 100 is stored in the database as the current playback speed.

At stage 104, the module 34 queries the database 40 for the date at which the current playback speed was last set/adjusted, i.e., the playback speed date. As with the speed setting, if the module 34 has not yet been invoked for a transcriptionist-speaker pair, this query will return a default value for the date, such as 0.

At stage 106, the module 34 queries the database 40 for a list of speed settings for the selected transcriptionist-speaker pair for all documents edited since the playback speed date. The speed setting values are measured by the editing device 20, e.g., as a result of transcriptionist actions during the editing of each dictation, as described above. As a whole, the speed settings express the transcriptionist's attitude concerning how fast the transcriptionist is willing to playback dictations from the selected speaker.

At stage 108, the update playback speed module 34 loops through each member of the speed settings list and counts how many times the transcriptionist chose a faster (Nfaster) or slower (Nslower) speed than the current playback speed for the speaker. The total number of dictations (Ndictation) to be counted is determined from the length of the speed settings list.

At stage 110, an inquiry is made as to whether the number of dictations equals or exceeds a threshold number of dictations, e.g., 10. Preferably, the update playback speed module 34 is exited immediately at stage 112, without changing the current playback speed for the transcriptionist-speaker unless there are a sufficient number of documents since the playback speed date.

If at stage 110 it is determined that Ndictation is greater than or equal to the threshold, here 10, then the process 100 proceeds to stage 114 where a counter is used as a means of indexing into the speed settings list. A counting loop is implemented by initializing all of the counters to 0.

At stages 116, 118, 120, 122, 124, 126, 128, 130, the module 34 cycles through each speed setting in the list and compares it with the CPS. If the speed from the list is not ignored at stage 120 and is less than the CPS (stage 122) (i.e., indicating less time relative to the CPS to play the audio), then the N faster variable is incremented (stage 124). If the speed value from the list is not ignored at stage 120 and is greater than the CPS (stage 126) (i.e., indicating more time relative to the CPS to play the audio), then the Nslower variable is incremented (stage 128). If the speed from the list is not ignored at stage 120 and equals the CPS, then neither Nfaster nor Nslower is incremented. At stage 130, the counter is incremented such that when the counter exceeds Ndictation, indicating that all the speeds from the list have been compared to the CPS, then the process 100 proceeds to stage 132.

At stage 120, the software module 34 invokes a submodule to ignore speed settings representing some degree of resistance on the part of the transcriptionist to increasing the playback speed. An ignore-speed-setting submodule is called with the current playback speed and the speed setting being considered as parameters. The submodule returns a boolean value of TRUE or FALSE depending on whether the speed setting should be ignored or not. The submodule returns TRUE for any dictations with a setting above some absolute threshold (e.g., 115, but this may vary), e.g., to ignore dictations that may have been slowed down only for the last few seconds. For the remaining settings, each is ignored if it is 30% higher (slower) than the current playback speed and it is "isolated" in that:

a) the greater than 30% slower condition did not occur two or more dictations in a row. The speed settings are returned in chronological order for this predicate.

b) the greater than 30% slower conditions happened:
    <10% of the time in a speed settings list with 20 or fewer dictations
    <5% of the time in a speed settings list with 21-40 dictations
    <2% of the time in a speed settings list with 40 or more dictations At stage 132, an attitude of the transcriptionist for the selected speaker is determined. The attitude is determined by the module 34 according to the equation:

Attitude=100 (Nslower−Nfaster)/Ndictation.

For example, if a transcriptionist-speaker pair has a current playback speed of 80, and the speed setting list has speeds of: 80, 80, 102, 80, 79, 130, 80, 80, 80, 80, then there are two documents played slower than the setting (at 102 and 130), one document played faster (79), and 10 documents total, so the attitude is 100 (2−1)/10=10. Positive values for the attitude indicate that the transcriptionist feels the current playback setting is too fast, where as negative values of the attitude indicate that the transcriptionist can tolerate more speeding up of the audio.

At stage 134, the module 34 computes a median playback speed value. This value is the mid-point value of all the speeds in the speed-settings list. The median playback speed is used as a fallback setting in case the transcriptionist resists the speedup proposed by the system 10.

At stage 136, the attitude is quantized into regions. For example, the module 34 can quantize the attitude into regions according to the following table:

TABLE 1

| Attitude Vale | Region |
| --- | --- |
| >30 | +2 |
| [10, 30) | +1 |
| (0, 10) | 0 |
| [−15, 0] | −1 |
| <−15 | −2 |

The magnitude and sign (+/−) of the region indicate the transcriptionist's willingness or reluctance to have the audio played faster.

At stage 138, the module 34 determines the new playback speed for the transcriptionist-speaker combination. The module can determine the new speed in a find playback adjustment sub-module. The intention of this sub-module is to apply linear changes to the playback speed, and get more and more conservative as the playback speed increases. Adjustments to the playback speed are determined by the find playback adjustment sub-module in accordance with the following playback speed change table, as a function of region and current playback speed CPS.

TABLE 2

|  | Attitude Region | | |
| --- | --- | --- | --- |
| CPS | <0 | 0 | >0 |
| 95-100 | −5 | 0 | +5 |
| 84-94 | −4 | 0 | +4 |
| 81-83 | −3 | 0 | +3 |
| 77-80 | −3 | +3 | +3 |
| 70-76 | −2 | +2 | +2 |
| 69 | −1 | +1 | +1 |

At stage 140, the find speed adjustment sub-module computes the new speed for audio playback. The new speed is found by adding the appropriate adjustment reflected in Table 2 to the CPS, and taking the minimum of this setting and a maximum (slowest) value of 100.

At stage 142, an inquiry is made as to whether the attitude region is −2, indicating a strong acceptance (willingness) by the transcriptionist to faster speed settings. If the region is not −2, then the process 100 proceeds to stage 146. If the region is −2, then the process 100 proceeds to stage 144 where the new speed is set to the minimum of the proposed new speed and the median speed determined at stage 134.

At stage 146, an inquiry is made as to whether the attitude region is +2, indicating a strong resistance by the transcriptionist to faster speed settings. If the region is not +2, then the process 100 proceeds to stage 150. If the region is +2, then the process 100 proceeds to stage 148 where the new speed is set to the maximum of the proposed new speed, the median speed determined at stage 134, and an upper limit, here 110.

At stage 150, the module 34 updates the database 40 with the new speed. The new speed is stored in association with the transcriptionist and speaker for use as an initial playback speed for the next recording by the speaker to be played back by the transcriptionist. Adding information to the database 40 helps the server 24 learn and adapt to transcriptionists and transcriptionist-speaker pairs. As mentioned above, the playback speed may be stored in association with further criteria. For example, the speed setting may be associated with the speaker 12, the transcriptionist, and the type of work with which the recording by the speaker 12 is associated. Still further criteria could be used instead of or in addition to work type for specifying for what playback the determined setting will be used.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

In alternative embodiments, the attitude region is further adjusted by the speaking rate of the speaker 12. Speakers are categorized as slow, normal or fast according to whether their speaking rate lies in the low 25-percentile, mid 50-percentile of high 25-percentile of speakers. This speaking-rate parameter may be computed using average word durations obtained from the word-alignments computed by the automatic transcription device 30. The speaker's region is stored in the database 40 as a field in the record for each speaker 12. For fast speakers, the attitude region is adjusted up by 1, and for slow speakers the attitude region is adjusted down by 1. This new region affects the table-lookup for the speed adjustment as described above.

Furthermore, embodiments of the invention may use the average speed setting for a transcriptionist for all speakers to affect the adjustment to the CPS determined by the update playback speed module 34. For example, for attitudes reflecting a willingness by the transcriptionist for fast audio playback, adjustments may be increased, e.g., doubled, if the new speed would be slower than the mean speed setting for the transcriptionist. For attitudes reflecting a mild resistance to faster playback, the adjustment can be made slightly faster than indicated by Table 2, e.g., by being adjusted downward (faster) by one.

In these embodiments, the process 100 can be used with some modifications. For example, stage 132 can be modified to determine the transcriptionist's attitude in a slightly different way. The attitude can be determined by analyzing only speed settings with a value of less than 120 and calculating:

Attitude=100(Mslower−Mfaster)/(Mslower+Msame+Mfaster)

where Mslower, Mfaster, and Msame are the number of speed settings that are less than 120 and are slower, faster, and the same as, respectively, the current setting for the transcriptionist-speaker pair. Negative numbers for the attitude reflect that the transcriptionist more frequently wanted faster audio playback than as currently set. Attitude values near zero indicate that the transcriptionist accepts the suggested playback speed. Large positive attitude values indicate that the transcriptionist resists increases in the playback speed.

Furthermore, a stage is added to the process 100 for computing the average (mean) speed setting for the transcriptionist across all of the speakers 12. The mean is determined by mathematically averaging all speed settings for all speakers as edited by the particular transcriptionist. Some settings may be ignored, e.g., if the settings are particularly high or low in an absolute or relative sense.

Figure 5:
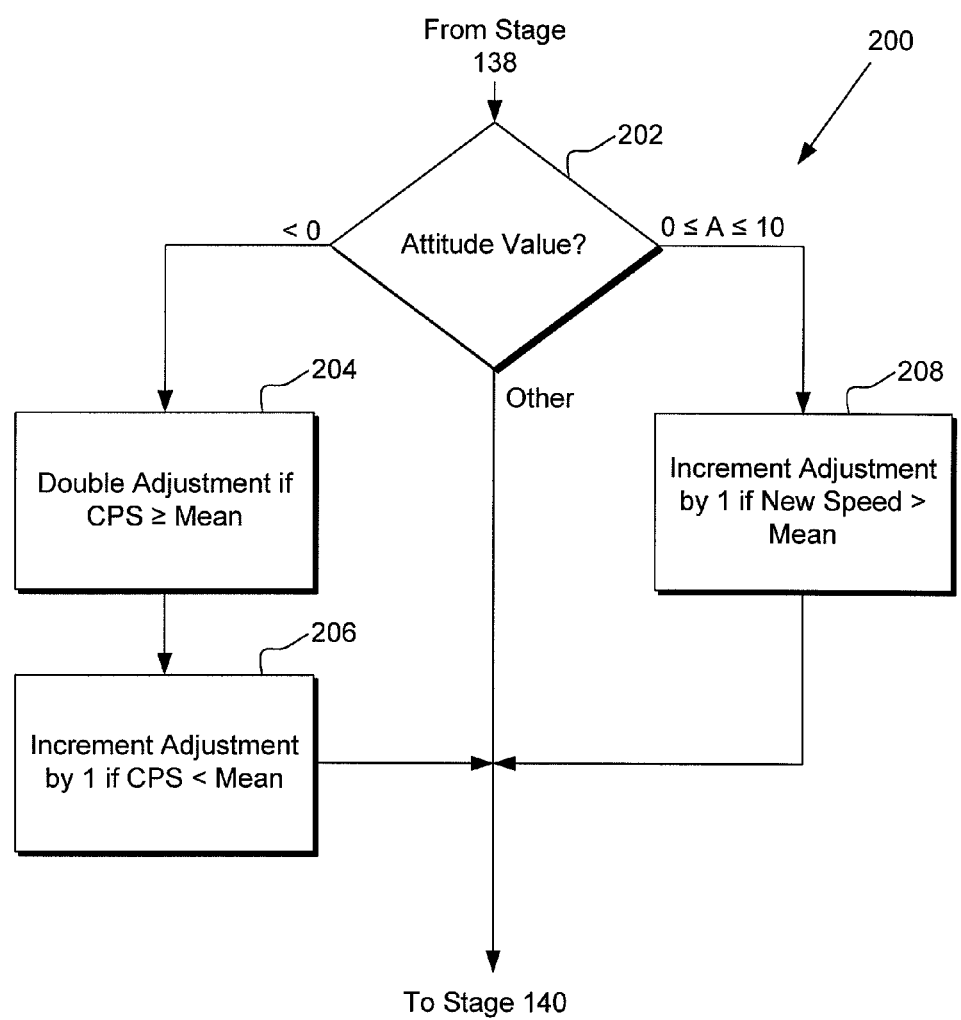
FIG. 5 is a block flow diagram of a process of determining a speed adjustment value for use in the process shown in FIGS. 3-4.

The process 100 is further modified by inserting a mini-process 200, including stages 202, 204, 206, 208, shown in FIG. 5, between stages 138 and 140. A modified adjustment value determined in stages 204, 206, 208 is used in stage 140 as the adjustment value.

At stage 202, an inquiry is made as to the attitude of the transcriptionist. If the attitude is less than zero, then the process 200 proceeds to stage 204. If the attitude is between 0 and 10, then the process 200 proceeds to stage 208. Otherwise, the process 200 ends and flow proceeds in the process 100 to stage 140.

At stage 204, the adjustment is modified if the CPS is greater than or equal to the mean setting. In this case, the modified adjustment is determined by doubling the adjustment determined from Table 2. Thus, e.g., if the mean is 85 and the adjustment from Table 2 is −4, then the modified adjustment becomes −8.

At stage 206, the adjustment is modified if the CPS is less than the mean setting. In this case, the modified adjustment is determined by incrementing the adjustment determined from Table 2 by one. Thus, e.g., if the mean is 85 and the adjustment from Table 2 is −3, then the modified adjustment becomes −4.

At stage 208, the adjustment is modified if the would-be new speed is greater than the mean. The would-be new speed is determined by adjusting the CPS by the adjustment determined from Table 2. If the would-be new speed setting is greater (slower) than the mean speed setting, then the adjustment is modified by incrementing the adjustment by one. Thus, e.g., if the mean is 85, the CPS is 94 and the adjustment from Table 2 is −4, then the would-be new speed is 91 (94+(−4)) and the modified adjustment is −5.

Still other embodiments are within the scope and spirit of the appended claims. For example, embodiments of the invention may have limits on the playback speed, e.g., 200 for a slowest-allowable speed and 50 as a fastest-allowable speed. Also, in embodiments where the mean speed setting for a transcriptionist across all speakers is determined, for speakers that are new to the transcriptionist, the speed is preferably set to the mean setting for that transcriptionist. Further, final speed settings associated with a transcription may be determined in a variety of ways. The final speed may be determined by ignoring the beginning and ending of a transcription playback and, e.g., averaging the speed, or taking the median speed, of the remaining portion of the transcription playback. The final speed may be determined by obtaining the speed setting for the longest period during the playback where there are no interruptions (e.g., release of the foot pedal). The final speed may be determined to be the average (or other aggregate measure) of the speed for all unedited portions of the transcription. Other techniques for determining the final speed for a transcription playback may be used.

Figure 6:
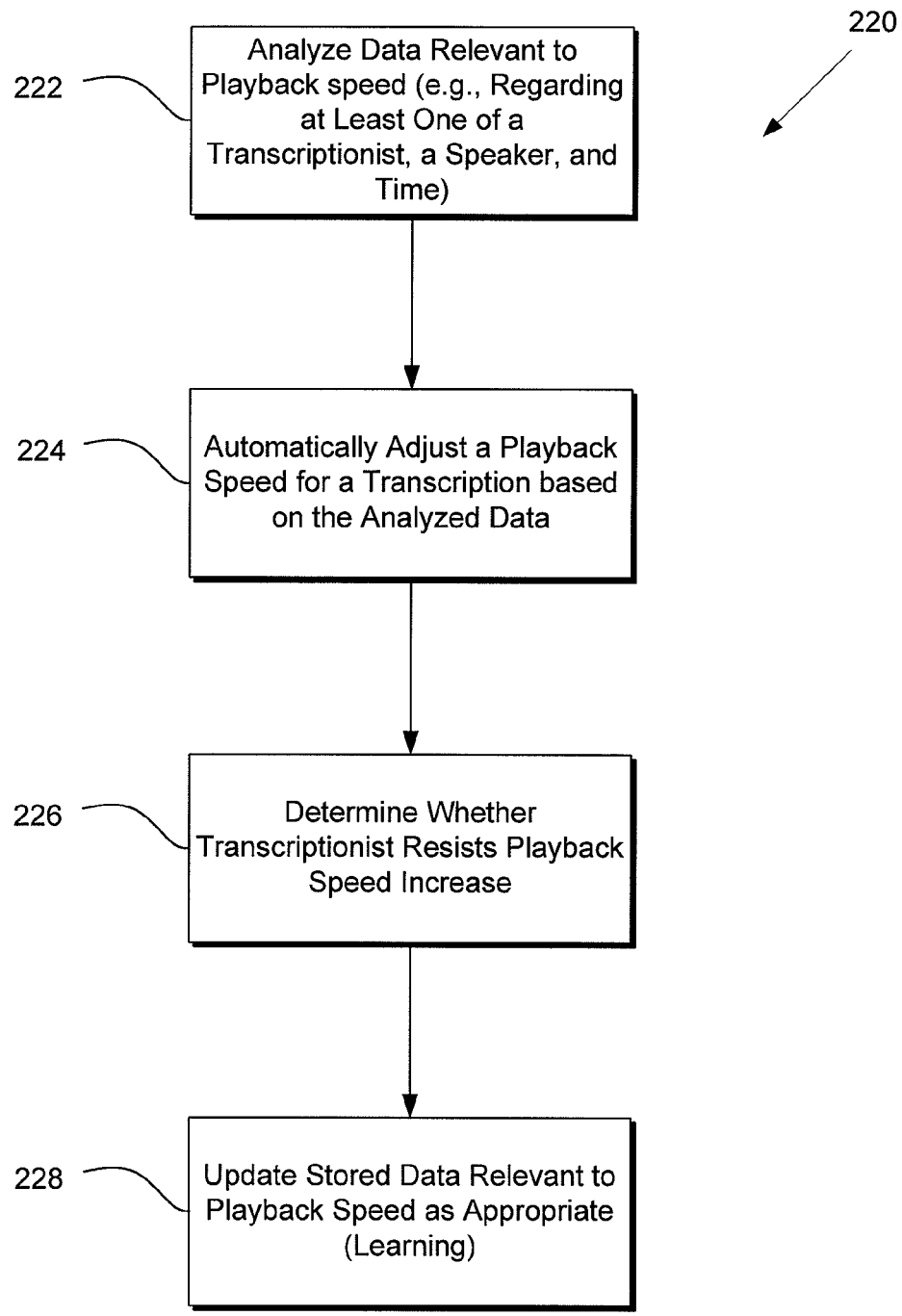
FIG. 6 is a block flow diagram of a process of determining and automatically setting a playback speed for a transcription review.

Still further embodiments are within the scope and spirit of the invention. For example, playback speed of a transcription may be determined and/or modified in a variety of ways. In operation, referring to FIG. 6, with further reference to FIGS. 1-2, a process 220 for regulating the playback speed of a transcribed dictation using the system 10, and in particular the update playback speed module 34, includes the stages shown. The process 220, however, is exemplary only and not limiting. The process 300 can be altered, e.g., by having stages added, removed, or rearranged.

At stage 222, data relevant to transcription playback speed are analyzed. The analyzed data represent a playback speed history of a transcription playback and may include, e.g., data regarding a transcriptionist, a speaker, and/or time. The data may represent a history even if a transcription review has not begun in that an initial speed may be pre-set, representing the history. The playback speed history is indicative of at least one speed associated with the transcription playback. This history may be a list of multiple speeds used during all or one or more portions of the playback, or may be a single speed indicative of an aggregate (e.g., average) playback speed of all or one or more portions of the playback, or combinations of these, and/or other indicia. The analysis may involve aggregating multiple speed settings, viewing a single aggregated speed setting, viewing a single (e.g., final) speed setting, etc. The analysis may be for transcriptions involving the same speaker as for a current transcription to be played or being played, may be for the same or a different listener/transcriptionist as for the transcription to be played or being played, and may be performed before or during playback of a current transcription.

At stage 224, a playback speed is determined and automatically set for the current transcription based on the analyzed data. The playback speed may be an initial speed or a playback speed during the playback. The determination is based on the analyzed history (be it one or more speed settings). Furthermore, the determination of the playback speed may also be based on influences other than the playback speed history, whether the history is for the speaker-transcriptionist pair, combinations of the speaker with other transcriptionists, or combinations of these. For example, the speed may be determined/adjusted occasionally based on playback history and other factors such as passage of time, the number of reviews performed by the transcriptionist, the number of reviews of the instant speaker's transcriptions by the transcriptionist, etc. (including combinations of such factors). The playback speed may thus, for example, be increased based on periodic events such as time and/or aperiodic events such as the number of reviews performed by the transcriptionist. The speed may be increased, e.g., weekly, and/or every X number of reviews performed (e.g., every 10, 20, 50, 100, etc.), and resistance by the transcriptionist monitored.

At stage 226, the module 34 determines whether the transcriptionist resists speed increases. If the transcriptionist resists a speed increase, then future adjustments may be affected, e.g., further speed increases may not be implemented or may be delayed, e.g., bi-weekly instead of weekly, and/or may be reduced in amount (e.g., 2% faster instead of 3% faster).

At stage 228, speed settings are recorded for use in setting other speed settings. Recording the speed settings helps the system 10 learn and adapt to tendencies of speakers, transcriptionists, and speaker-transcriptionist pairs. The other speed settings may be initial and/or mid-review speed settings for reviews by the same transcriptionist for the same speaker, for the same transcriptionist and a different speaker, and/or for the same speaker and a different transcriptionist.

The process 220 may be used to determine and set the playback speed for a variety of speaker/transcriptionist combinations. Thus, for example, playback speeds for a speaker may be used to set an initial speed to be used to review a transcription for that speaker by a transcriptionist new to reviewing that speaker's transcriptions. The process 220 may be used to adjust the playback speed for a transcriptionist-speaker pair based on speeds used by other transcriptionists for that speaker. For example, if a particular transcriptionist reviews a particular speaker slower than other transcriptionists (e.g., most others, or an average or median of others, etc.), then the speed may be increased for that transcriptionist. Also, an initial playback speed for a transcriptionist new to reviewing a particular speaker's transcriptions may be set based on speeds at which other transcriptionists review that speaker's transcriptions (e.g., the average, or other related speed, possibly adjusted to be slower to account for the unfamiliarity of the transcriptionist with the speaker).

What is claimed is:

1. A computer program product residing on a computer-readable medium and comprising computer-readable, computer-executable instructions for causing a computer to:

analyze a first playback speed history for at least one audio recording recorded by a first speaker and played by a first listener, the first playback speed history being indicative of at least one playback speed associated with the at least one audio recording; and determine, from the first playback speed history and a current playback speed setting associated with the first speaker, a speed setting for playback of another audio recording recorded by the first speaker to be played by the first listener, wherein the instructions are configured to cause the computer to determine the speed setting by modifying an adjustment to be made to the current playback speed setting based at least on an average playback speed of audio recordings, other than the another audio recording, by multiple speakers listened to by the first listener.

2. A computer program product residing on a computer-readable medium and comprising computer-readable, computer-executable instructions for causing a computer to:

analyze a first playback speed history for at least one audio recording recorded by a first speaker and played by a first listener, the playback speed history being indicative of at least one playback speed associated with the at least one audio recording; and determine from the first playback speed history and a current playback speed setting a speed setting for playback of another audio recording recorded by the first speaker to be played by the first listener, wherein the instructions are configured to cause the computer to analyze the first playback speed history to determine an indication of a willingness or reluctance of the listener to listen to recordings of the speaker faster than the current playback speed by ignoring a speed setting in the first playback speed history.

3. The computer program product of claim 2 wherein the instructions are configured to cause the computer to ignore the speed setting in the first playback speed history if the speed setting is at least one of above an absolute threshold, and above a threshold that is dependent upon the current playback speed and is isolated.

4. The computer program product of claim 1 wherein the instructions are configured to cause the computer to determine the speed setting by averaging speeds indicated by the first playback speed history.

5. The computer program product of claim 1 wherein the speed setting is an initial speed setting for playback.

6. The computer program product of claim 1 further comprising instructions for causing the computer to store an indication of the determined speed setting as part of a second playback speed history such that the computer program product can learn from historical speed settings and adapt future speed settings based on the historical speed settings.

7. A computer program product residing on a computer-readable medium and comprising computer-readable, computer-executable instructions for causing a computer to:

analyze a first playback speed history for at least one audio recording recorded by a first speaker and played by a first listener, the playback speed history being indicative of at least one playback speed associated with the at least one audio recording; and determine a speed setting for playback of another audio recording recorded by a second speaker to be played by a second listener, wherein the speed setting is determined based on at least one of an amount of time spent transcribing by the first listener, a number of transcriptions reviewed by the first listener, and a number of transcriptions of the first speaker reviewed by the first listener.

8. A device for use in a transcription editing system for editing transcriptions of dictations from speakers by transcriptionists, the device comprising:

an interface configured to receive historical indicia of playback speeds used by the transcriptionists; and playback speed means, coupled to the interface, for determining and setting a future playback speed for a selected transcriptionist based on a historical playback speed associated with at least one of the transcriptionists, and for sending a future-speed indication of the future playback speed to the interface, the future playback speed determined using a current playback speed setting associated with at least one of the transcriptionists and a speaker;

wherein the historical playback speed is indicative of at least one playback speed associated with a playback speed used by at least one of the transcriptionists, the interface is further configured to convey the future-speed indication from the playback speed means, wherein the playback speed means analyzes the historical playback speed indicia to determine an indication of a willingness or reluctance of the at least one transcriptionist to listen to recordings of a speaker faster than the current playback speed, the indication of willingness or reluctance being determined by ignoring a speed setting in the historical playback speed indicia.

9. The device of claim 8 wherein the interface is configured to communicate over a network with a database that stores the historical playback indicia to store the future playback speed.

10. The device of claim 8 wherein the future playback speed is an initial playback speed.

11. A device for use in a transcription editing system for editing transcriptions of dictations from speakers by transcriptionists, the device comprising:

an interface configured to receive historical indicia of playback speeds used by the transcriptionists; and playback speed means, coupled to the interface, for determining and setting a future playback speed for a selected transcriptionist based on a historical playback speed associated with at least one of the transcriptionists, and for sending a future-speed indication of the future playback speed to the interface;

wherein the historical playback speed is indicative of at least one playback speed associated with a playback speed used by at least one of the transcriptionists, the interface is further configured to convey the future-speed indication from the playback speed means, wherein the playback speed means is configured to determine the future-speed indication using at least one of an amount of time spent transcribing by a particular transcriptionist, a number of transcriptions reviewed by the particular transcriptionist, and a number of transcriptions of a particular speaker reviewed by the particular transcriptionist.

12. A method of determining a transcription audio playback speed, the method comprising:

analyzing a first playback speed history for at least one audio recording recorded by a first speaker and played by a first listener, the playback speed history being indicative of at least one playback speed associated with the at least one audio recording;

determining from the first playback speed history a speed setting for playback of another audio recording recorded by the first speaker to be played by the first listener using a current playback speed setting associated with the first speaker and the first listener; and determining an indication of willingness or reluctance of the first listener to listen to recordings of the first speaker faster than the current playback speed by ignoring a speed setting in the first playback speed history.

13. The method of claim 12 wherein the speed setting is ignored in the first playback speed history if the speed setting is at least one of above an absolute threshold, and above a threshold that is dependent upon the current playback speed and is isolated.

14. The method of claim 12 wherein determining the speed setting includes averaging speeds indicated by the first playback speed history.

15. The method of claim 12 wherein the speed setting is an initial speed setting for playback.

16. The method of claim 12 further comprising storing an indication of the determined speed setting as part of a second playback speed history to learn from historical speed settings and adapt future speed settings based on the historical speed settings.

17. A method of determining a transcription audio playback speed, the method comprising:
    analyzing a first playback speed history for at least one audio recording recorded by a first speaker and played by a first listener, the playback speed history being indicative of at least one playback speed associated with the at least one audio recording; and
    determining from the first playback speed history a speed setting for playback of another audio recording recorded by a second speaker to be played by a second listener,
    wherein the speed setting is determined based on at least one factor comprising at least one of an amount of time spent transcribing by the first listener, a number of transcriptions reviewed by the first listener, and a number of transcriptions of the first speaker reviewed by the first listener.

18. The computer program product of claim 7 wherein the first speaker is the second speaker.

19. The computer program product of claim 7 wherein the first listener is the second listener.

20. The computer program product of claim 7 wherein the speed setting is an initial speed setting for playback.

21. The computer program product of claim 7 further comprising instructions for causing the computer to store an indication of the determined speed setting as part of a second playback speed history such that the computer program product can learn from historical speed settings and adapt future speed settings based on the historical speed settings.

22. The method of claim 12 wherein determining the speed setting includes modifying the adjustment based at least on a second playback history for at least one audio recording recorded by a second speaker and played by the first listener.

23. The method of claim 22 wherein the adjustment is modified based on an average playback speed associated with the first listener.

24. The method of claim 12 wherein analyzing the first playback speed history includes categorizing the indication into one of a plurality of ranges of willingness or reluctance.

25. The method of claim 24 wherein determining the speed setting includes determining an adjustment to be made to the current playback speed setting based on with which of the ranges the indication is associated.

26. The method of claim 17 wherein the first speaker is the second speaker.

27. The method of claim 17 wherein the first listener is the second listener.

* * * * *